United States Patent [19]

Shimizu

[11] Patent Number: 5,526,206
[45] Date of Patent: Jun. 11, 1996

[54] MAGNETIC DISK DEVICE WITH HEAD LIFT SYSTEM

[75] Inventor: Haruyoshi Shimizu, Kawasaki, Japan

[73] Assignee: Fuji Electric Co., Ltd., Japan

[21] Appl. No.: 340,863

[22] Filed: Nov. 15, 1994

[30] Foreign Application Priority Data

Nov. 18, 1993 [JP] Japan ................... 5-288875

[51] Int. Cl.$^6$ ............................. G11B 5/54; G11B 21/22
[52] U.S. Cl. ............................................................ 360/105
[58] Field of Search ............................................... 360/105

[56] References Cited

U.S. PATENT DOCUMENTS

| 5,189,575 | 2/1993 | Onooka et al. | 360/105 |
| 5,237,472 | 8/1993 | Morehouse et al. | 360/105 |
| 5,289,325 | 2/1994 | Morehouse et al. | 360/105 |

FOREIGN PATENT DOCUMENTS

| 6-76509 | 3/1994 | Japan | 360/105 |
| 92-11630 | 7/1992 | WIPO | 360/105 |

OTHER PUBLICATIONS

IEEE Transactions on Magnetics, vol. 28, No. 5, Sep. 1992 "Development of a New Sub–Sub Micron Flying Ramp–" by Hashimoto et al.

*Primary Examiner*—John H. Wolff
*Attorney, Agent, or Firm*—Rossi & Associates

[57] ABSTRACT

The invention provides a simply constructed magnetic disk device with a head lift system that can improve reliability and reduce costs. A head arm is integrated with a rigid base section, a spring, and a rigid tip. A magnetic head is fixed to the tip of a head holder. A contact section of a lateral bar form is formed in the tip, which is normally kept away from the under surface of the head holder so that it will not make contact. When the tip is lifted, however, the contact section contacts the under surface of the head holder and lifts it together. To contact with the pin fixed on the tip of the tip, a cam is engraved and formed on part of a cover plate. The cam consists of a plane section, an inclined section which ascends to the left in the figure, and a semi-circular concave section into which the pin can be fitted, thus forming a contour face. The pin moves depending on the contour to a predetermined position when the head arm turns toward the center, and the magnetic head departs from the disk during a head lifting operation.

4 Claims, 2 Drawing Sheets

MAGNETIC DISK DEVICE WITH HEAD LIFT SYSTEM

FIELD OF THE INVENTION

The present invention relates to a so-called head lift-type magnetic disk device in which, when a fluctuating head arm turns toward the center or the circumference of a disk, a magnetic disk head is separated from the disk face at a predetermined position close to the center or the circumference.

BACKGROUND OF THE INVENTION

Magnetic disk devices in general use a so-called contact start stop (CSS) system, which starts and stops a disk when a magnetic head is contacted. Such a system requires so-called texture processing to form micro-fine irregularities on a disk surface to reduce the friction coefficient between the disk surface and the magnetic head. Such texture processing, however, causes an increase in the disk surface roughness, while a micro-fine geometric condition adversely affects electromagnetic conversion characteristics in magnetic recording on the other hand. In addition, a disk-rotating motor requires a large starting torque when starting disc rotation.

In order to avoid such problems, different head lift systems have been proposed to separate the magnetic head from the disk surface when the disk is either started or stopped. One of these systems inserts a wedge-like part between the head holders (head suspensions) of plate spring form arranged so that they face each other. Another system is a system that is disposed with a drive mechanism such as an actuator using a solenoid, spring, or piezoelectric elements.

One of the above-mentioned head lift systems has problems such that, because the direction of the force of a head lift is slanted against the lift direction depending on the angle of the wedge-like part, the magnetic head suffers a collision along the face when the depending on the angle of the wedge-like part, the magnetic head suffers a collision along the face when the head separates from or lands on the disk face, thereby causing an additional flaw. Moreover, because the lift location of the magnetic head is constructionally limited to the disk's circumference, the disk recording region is reduced. Another system of the conventional head lift systems requires a complex and precise mechanism, and complex and difficult assembly and adjustment processes, resulting in reduced reliability and increased production costs.

The present invention solves the above-mentioned problem by providing a magnetic disk device with a head lift system that eliminates the problems encountered by conventional technologies, thereby improving reliability and reducing costs because of its simple construction.

SUMMARY

The magnetic disk device of the invention includes a magnetic head connected with a head arm that is lifted off a surface of a disk at a predetermined position close to a center of the disk toward which the head arm turns, wherein the head arm comprises a rigid base, a rigid tip providing a contact section and a pin, and a spring which couples the rigid tip with the rigid base. The magnetic head is attached to a head holder of a spring plate which is connected with the rigid base and eventually contacts with the contact section of the rigid tip. A cam is further provided which has a contour comprising an inclined section and a concave section, wherein the inclined section is inclined with respect to the disk surface and eventually contacts with the pin of the rigid tip of the head arm, and wherein the concave section is adjacent to the inclined section for placing the pin.

The cam also preferably includes a first plane section which is disposed in the contour adjacent to the inclined sections and is parallel to the disk surface, and a second plane section which is provided over the contour so as to face a whole contour range and is parallel to the first plane section, the first and the second plane sections being constructed so that neither of them contact with the pin under normal operating conditions. If the device is subjected to a large vibration and/or strong shock, the pin contacts the first and second plane section to prevent extreme displacement in the vertical direction of the head arm to the disc face.

In the above described devices, the pin at the head arm tip contacts the inclined section of the cam at a predetermined position close to the center of a disk when the head arm turns toward said center, slides along the inclined section, and is then fitted into a concave section where it is held temporarily. Together with the sliding movement of the pin along the cam inclined section, the contact part of the head arm first contacts a head holder, and then the magnetic head disposed on the tip of this head holder is separated from the disk face. Next, the magnetic head stops when the pin is fitted into the concave section.

Alternatively, the magnetic head can depart from the disk surface at a position close to the circumference of the disk when the head arm turns toward the circumference of the disk. In such a case, the pin at the head arm tip contacts the inclined section of the cam at a predetermined position close to the circumference of a disk when the head arm turns toward said circumference and slides along the inclined section, and then is fitted into a concave section where it is held temporarily. Together with the sliding movement of the pin along the cam inclined section, the contact part of the head arm first contacts a head holder, and then the magnetic head disposed on the tip of this head holder is separated from the disk face. Next, the magnetic head stops when the pin being fitted into the concave section stops

BRIEF DESCRIPTION OF THE DRAWINGS

The invention will be described in greater detail with reference to the drawings, wherein:

FIGS. 2(a)–(c) illustrate the operation of a magnetic head against a disk in the embodiment illustrated in FIG. 1, wherein FIG. 2(a) is a front view during contact, FIG. 2(b) is a front view when the head is being lifted, and FIG. 2(c) is a front view after the head has been lifted.

DETAILED DESCRIPTION OF THE PREFERRED EMBODIMENTS

Figure 1:
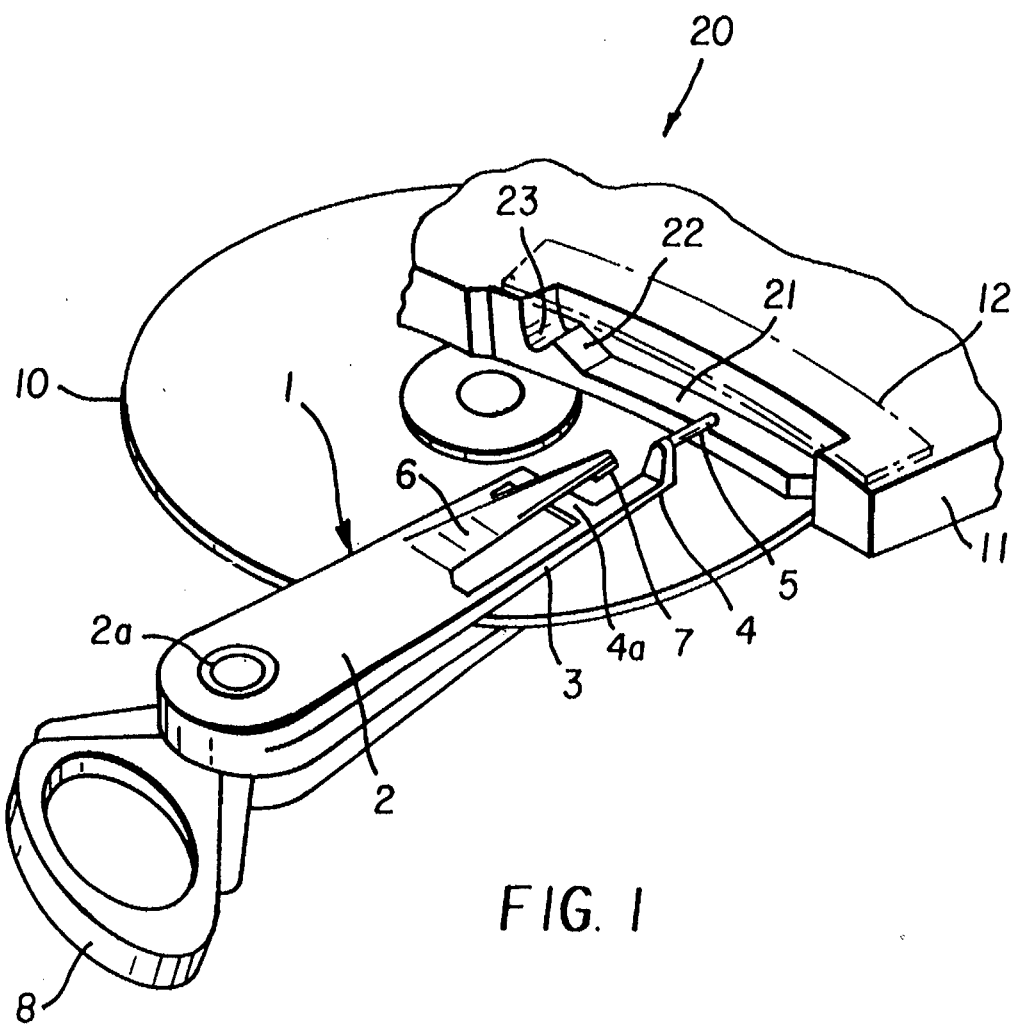
FIG. 1 is a perspective view of one embodiment of the present invention.

A first embodiment of the magnetic disk according to the present invention is explained with reference to the FIG. 1. In FIG. 1, a head arm 1, which comprises a rigid base part 2, a spring 3, and a rigid tip 4, is supported rotatably by a bearing 2a. A voice coil 8 for a rotary-drive is disposed at the edge of the bearing 2a side of the base part 2. A head holder (head suspension) 6, constructed as a spring plate, is fixed on the other edge of the base part 2 near the border with the spring 3, and a magnetic head 7 is fixed at the tip of the head holder 6. The magnetic head 7 approaches the surface of a disk 10 during data writing and reading and is levitated slightly from the surface of the disk 10 due to its rotation. The magnetic head 7 separates from the disk 10 before its rotation stops and during the stop as described later. A contact section 4a of a lateral bar shape is formed integratedly in the tip 4 near the border with a spring 3. This contact section 4a is normally kept away from the head holder 6 so that it will not contact the lower surface of the head holder 6; however when the tip 4 lifts, it contacts the lower surface of the head holder 6 and can be lifted together with the tip 4. In addition, a pin 5 is fixed at the edge of the tip 4 so that it protrudes externally.

A cam 20 is engraved and formed on part of a cover plate 11 for a proper interaction with the pin 5. This cam 20 has a contour surface comprising a plane section 21 (first plane section), an inclined section 22, which ascends to the left side as shown in the figure, and a semicircular concave section 23 into which the pin 5 can be fitted. The pin 5 moves along this contour surface as described later in detail. A flat plate 12 shown in dotted lines is fixed on top of the cover plate 11 in a form facing the contour face of the cam 20. The under surface of this flat plate 12 is a plane section (second plane section), and is parallel to the flat section 21 of the cam 20. The same mechanism is disposed symmetrically on the other side of the disk 10, whereas the magnetic head has one end of the respective head arms 1 connected by the bearing 2a, said head arms being driven by a common voice coil 8.

Figure 2A:
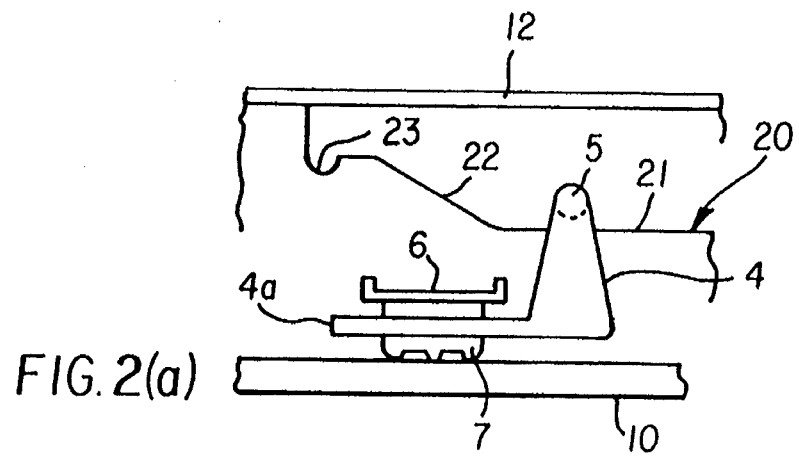
Figure 2B:
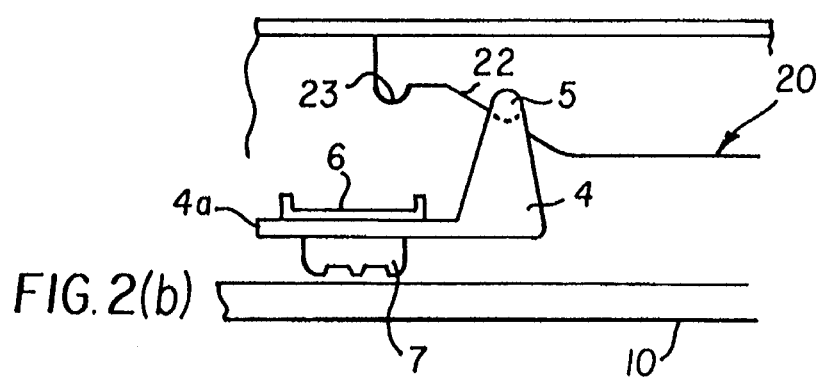
Figure 2C:
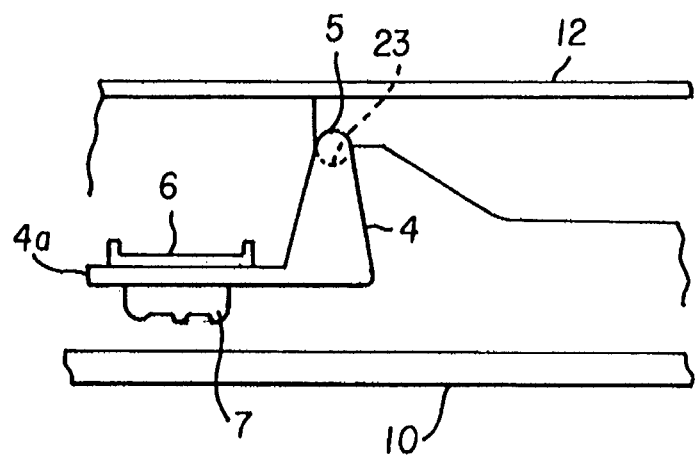

Next, the operation of the magnetic head 7 relative to the disk 10, and the operation of the pin 5 relative to the contour face of the cam 20 are explained with reference to FIG. 2. FIG. 2 relates to the operation of the magnetic head relative to the disk in the embodiment, whereas (a) is a front view during contact, (b) is a front view during the headlift process, and (c) is a front view at the end of the headlift. FIG. 2 (a) shows data writing and reading when the magnetic head 7 is levirated slightly from the surface of the disk 10 due to its rotation. At this time, the contact section 4a of the head arm 1 is separated away from the under surface of the head holder 6, as is the plane section 21 of the cam 20 from the pin 5, allowing adequate levitated proximity between the magnetic head 7 and the surface of the disk 10. Prior to stopping the disk 10, the head arm 1 is turned toward the center of the disk 10 by means of the voice coil-type drive, which is not shown, and the magnetic head 7 is separated from the surface of the disk 10 at a predetermined position near the center of the disk. This turning movement of the head arm 1 toward the center is executed by flowing electric current through the voice coil 8. The tip 4 moves to the left as the head arm 1 turns. When the predetermined position is reached, the pin 5 contacts the inclined section 22 of the cam 20, and rises thereafter along the inclined section 22. As a result of the lift of the pin 5, the contact section 4a is also lifted integratedly. This contact section 4a contacts the under surface of the head holder 6, and lifts it up. As a result, the magnetic head 7 moves away from the surface of the disk 10. FIG. 2 (b) shows a magnetic head 7 that is slightly separated from the surface of the disk 10. Thereafter, the pin 5 continues moving toward the left, eventually fitting into the concave section 22, and stops as shown in FIG. 2 (c). During this operation, the head holder 6 is lifted higher by the contact section 4a than in FIG. 2 (b), and the magnetic head 7 is further departed from the surface of the disk 10 before being positioned. At the start of the disk 10, the head arm 1 is turned toward the circumference of the disk 10 after rotating the disk 10, and brings the condition to that of FIG. 2 (a) from that of FIG. 2 (c) through FIG. 2 (b), by which the magnetic head 7 slowly approaches the surface of the disk 10 (soft landing).

As can be seen clearly from the above description, the present construction is simple as it does not require parts that are especially difficult to process, and the movement of the magnetic head at departure from or landing onto the disk is smooth. As a result, this invention improves reliability and reduces costs. Furthermore, the recording area of the disk is not reduced.

Meanwhile, according to the above explanation, the plane section 21 and the flat plate 12 in FIG. 2 have made no action whatsoever on the pin 5 directly. The reason for the existence of the plane section 21 and the flat plate 12 is to restrict strong vibration of the head arm in the vertical direction when the device is subjected to any large vibrations or strong shocks during use or shipment of the device. Abnormal displacement of the head arm 1 against the surface of the disk 10 in the vertical direction is restricted by contacting of the pin 5 with either the plane section 21 or the flat plate 12. Therefore, the safety of the device is assured. In other words, the device can effectively deal with unexpected vibrations and shocks.

In the above embodiment, the disk 10 rotation could be stopped after turning the head arm 1 toward the center of the disk 10, and the rotation could be started after turning the head arm 1 toward the circumference, by which the magnetic head 7 is either lifted from or landed onto from the disk 10. A system may be used as an inverse method that the head arm 1 is turned toward the circumference of the disk 10 to stop the disk, while the head arm is turned toward the center to start the disk. In the latter case, the cam contour ascends toward the circumference conversely to the case of the former embodiment.

The pin 5 at the tip of a head arm contacts the inclined section 22 of the cam 20 at a predetermined position close to the center or circumference of the head arm 1 when the head arm 1 turns toward the center or circumference of the disk, slides along the inclined section 22, and is then fitted into the concave section 23 where it is held temporarily. While the pin 5 is sliding along the cam inclined section 22, the arm contact section 4a first contacts the head holder 6, causing the magnetic head 7 disposed on the tip of the head holder 6 to separate from the disk face. Next, while the pin 5 is being fitted into the concave section 23, the magnetic head 7 stops. Therefore, the device's construction is simple and does not require parts that are especially difficult to process. Moreover, the movement of the magnetic head 7 at departure from or landing onto the disk 10 is smooth. As a result, the reliability of the device improves and costs are reduces. Furthermore, the recording area of the disk 10 is not reduced.

The present invention can most suitably be applied to a device with one disk. Nevertheless, this system can also be applied to a device mounting two or more magnetic disk media by using the above-mentioned method as it is in the uppermost and lowermost faces, while for the intermediate magnetic disk medium faces, the dedicated parts of a guide plate shape having the same function are arranged between the magnetic disk medium faces, and such functions may be added onto the guide plate as the rail-formed plane section, inclined section, and fitting concave section with the above-mentioned functions.

What is claimed is:

1. A magnetic disk device comprising:

a magnetic recording disk including a disk recording surface;

a head arm including a rigid base, a rigid tip, and a spring section which couples the rigid tip with the rigid base, wherein the rigid tip includes a contact section and a pin;

a magnetic head attached to a head holder which is connected to the rigid base, wherein the head holder is located above the contact section and contacts the contact section of the rigid tip when the magnetic head is lifted from the disk recording surface during a head lifting operation;

a cam affixed in a substantially radial position, and extending across and over the disk recording surface, said cam comprising a contour including a plane section located over the disk recording a surface, an inclined section located a adjacent to the plane section, and a concave section located adjacent to the inclined section, such that said inclined section is located between the plane section and the concave section, wherein said inclined section is inclined with respect to the disk recording surface and contacts with the pin of the rigid tip of the head arm during the head lifting operation, and wherein said concave section retains the pin after the pin has moved past the inclined section; and drive means for driving the head arm in a plane substantially parallel to the disk recording surface of the magnetic recording disk and parallel with the plane section of the cam;

wherein the contact section contacts the head holder and lifts the magnetic head when the pin contacts the inclined section, as the drive means drives the tip of the head arm across the plane section and into contact with the inclined section during the head lifting operation.

2. A magnetic disk device as claimed in claim 1, wherein said magnetic head is lifted off the disk recording surface of the magnetic recording disk at a predetermined position close to the center of the magnetic recording disk, when the drive means drives the head arm toward the center of the magnetic recording disk during the head lifting operation.

3. A magnetic disk device as claimed in claim 1, wherein said magnetic head is lifted off the disk recording surface of the magnetic recording disk at a predetermined position close to a circumference of the magnetic recording disk, when the drive means drives the head arm toward the circumference of the magnetic recording disk during the head lifting operation.

4. A magnetic disk device claimed in claim 1, wherein said cam further comprises:

a first plane section which is disposed in the contour adjacent to the inclined sections and is parallel to the disk surface; and a second plane section which is provided over the contour so as to face the contour and is parallel to the first plane section;

wherein the first and the second plane sections are located and constructed so that they do not make contact with the pin under normal operating conditions.

* * * * *